US008793889B2

(12) United States Patent
Hovren

(10) Patent No.: US 8,793,889 B2
(45) Date of Patent: Aug. 5, 2014

(54) DECK BOARD PLACEMENT TOOL

(76) Inventor: James D. Hovren, Boise, ID (US)

( * ) Notice: Subject to any disclaimer, the term of this patent is extended or adjusted under 35 U.S.C. 154(b) by 175 days.

(21) Appl. No.: 13/348,439

(22) Filed: Jan. 11, 2012

(65) Prior Publication Data

US 2013/0174498 A1 Jul. 11, 2013

(51) Int. Cl.
*G01B 3/30* (2006.01)
*G01B 3/32* (2006.01)

(52) U.S. Cl.
USPC .............................................. 33/527; 33/526

(58) Field of Classification Search
USPC .................................... 33/526, 527, 407, 474
See application file for complete search history.

(56) References Cited

U.S. PATENT DOCUMENTS 2,744,334 A * 5/1956 Jondole ........................... 33/613
2,893,125 A * 7/1959 Everett ............................ 33/407
2,911,022 A 11/1959 Brown
3,104,473 A * 9/1963 Rose ............................... 33/501
3,201,874 A * 8/1965 Christy ........................... 33/613
4,237,614 A * 12/1980 Williams ........................ 33/501
4,850,114 A 7/1989 Vockins
4,930,225 A * 6/1990 Phillips ........................... 33/526
4,955,142 A 9/1990 Rieck
4,989,336 A * 2/1991 Waltrip et al. .................. 33/526
5,123,172 A * 6/1992 Thrun ............................. 33/526
5,163,233 A * 11/1992 Benson ........................... 33/613
5,560,117 A 10/1996 Tallman
5,628,119 A * 5/1997 Bingham et al. ................ 33/613
6,243,961 B1 6/2001 Winski
6,385,858 B1 5/2002 Muller
6,508,010 B2 1/2003 Hanson et al.
6,539,641 B2 * 4/2003 Belliveau ........................ 33/526
8,209,874 B1 * 7/2012 Tribble et al. .................. 33/286
D668,562 S * 10/2012 Madrack ........................ D10/65
2005/0060902 A1 * 3/2005 Jones ............................. 33/474

* cited by examiner

*Primary Examiner* — Yaritza Guadalupe-McCall
(74) *Attorney, Agent, or Firm* — Pedersen and Company, PLLC; Ken J. Pedersen; Barbara S. Pedersen

(57) ABSTRACT

A carpenter's deck board and fastener positioning tool has a first, proximal part which rests temporarily on the top of a joist, and a second, distal part which rests temporarily on the top of a deck board to be installed. The first, proximal part has a pair of spaced-apart, downwardly extending tabs, one for extending along each side of the joist. This way, when the tool is placed on the joist, the tabs center the tool on the joist. The second, distal part is a longitudinal, substantially flat plate extending from the first, proximal part parallel to the joist, for resting on top of the deck board to be installed when the board is resting transversely on the joist. On or in the flat plate are fastener placements for enabling or indicating the proper location of fasteners for effectively connecting the deck board to the joist.

17 Claims, 14 Drawing Sheets

DECK BOARD PLACEMENT TOOL

BACKGROUND OF THE DISCLOSED TECHNOLOGY

1. Field of the Disclosed Technology

This disclosed technology relates generally to hand tools for carpenters. More specifically, this disclosed technology relates to a guide for carpenters to help place deck boards on patio joists, and to help indicate on the deck boards where fasteners like nails or screws may be most effectively placed to best position and connect the deck boards to the joists.

2. Related Art

There are several prior art devices which help the carpenter effectively place deck boards on joists. One style of such prior art devices helps the carpenter maintain proper spacing between deck boards. Illustrative of these prior art board spacing devices are those devices disclosed in, for example, U.S. Pat. Nos.:

U.S. Pat. No. 4,850,114 (Vockins),

U.S. Pat. No. 4,955,142 (Rieck),

U.S. Pat. No. 5,560,117 (Tallman), and

U.S. Pat. No. 6,508,010 (Hanson, et al.).

Also, there are several prior art devices which also help the carpenter effectively place fasteners on the deck boards. Illustrative of these prior art fastener placing devices are those devices disclosed in, for example, U.S. Pat. Nos.:

U.S. Pat. No. 4,930,225 (Phillips), and

U.S. Pat. No. 6,243,961 (Winski).

Still, there is a need for a simple, economic and effective dual-purpose placement and fastener guide for deck boards. Still sought after is a convenient guide for uniformly spacing adjacent deck boards, and for indicating on the deck boards where fasteners may be best placed, the fasteners being consistently and evenly spaced in the deck boards, and centered above the joists. This disclosed technology addresses that need.

SUMMARY OF THE DISCLOSED TECHNOLOGY

The herein disclosed technology is a carpenter's deck board and fastener positioning tool comprising a first, proximal part which rests temporarily on the top of a joist, and a second, distal part which rests temporarily on the top of a deck board to be installed. By "proximal" I mean closest to the hand of a user. By "distal" I mean farthest away from the hand of a user. The first, proximal part of the tool orients and indexes the second, distal part directly above the joist. Preferably, the first, proximal part has a pair of spaced-apart, downwardly extending tabs, one for extending along each side of the joist. Preferably, the tabs are spaced-apart about the width of the joist. This way, when the tool is placed on the joist, the tabs center the tool on and above the joist. In one embodiment, the downwardly extending tabs also assist to establish proper deck board spacing. In this embodiment, the most proximal ends of the spacer's tabs cooperate with the nearest side of the adjacent, already installed deck board, while the tabs' most distal ends touch the nearest side of the board presently to be installed. The thickness of the most proximal ends of the tabs are approximately equal to each other and approximately equal to the desired spacing distance between adjacent deck boards.

The second, distal part of the tool is connected to and extends outwardly from the first, proximal part. Preferably, the second, distal part is a longitudinal, substantially flat plate for resting on top of the deck board to be installed when that board is resting on the joist. Preferably, the center line of the longitudinal plate of the distal part of the tool is the same as, or parallel to, the centerline between the two downwardly extending tabs of the first proximal part. On or in the distal part flat plate are structure and/or indicia for indicating the proper placement of fasteners for effectively connecting the deck board to the joist.

The structure and/or indicia on or in the flat plate may be apertures therethrough which permit fasteners to pass through the plate at the location of the apertures. Or, the structure and/or indicia may be marks on the flat plate which indicate where the deck board may be marked to effectively place the fasteners. Or, the structure and/or indicia may be sharp points on the bottom of the plate which, when the top of the plate is rapped with a hammer, for example, the sharp points mark the top of the deck board with dents for indicating effective placement of the fasteners.

When the flat plate structure and/or indicia are apertures, they may be provided with optional upstanding fastener supports to conveniently hold the fasteners in place until they are driven into the deck board.

Also, an optional deck board spacer may extend downwardly from the most distal edge, for example, of the second, distal part of the tool when the flat plate thereof is about the length of the width of a deck board. In this embodiment, this board spacer's most distal end touches the nearest side of the adjacent, already installed deck board, while the spacer's most proximal end touches the farthest side of the board presently to be installed. The width of the spacer is approximately equal to the desired spacing distance between adjacent deck boards.

BRIEF DESCRIPTION OF THE DRAWINGS

FIG. 2B is a view like FIG. 2A, but with one fastener driven in, and one other fastener partly driven in.

DETAILED DESCRIPTION OF SEVERAL EMBODIMENTS OF THE DISCLOSED TECHNOLOGY

Referring to the Figures, there are shown several, but not all, embodiments of the disclosed technology.

Figure 1:
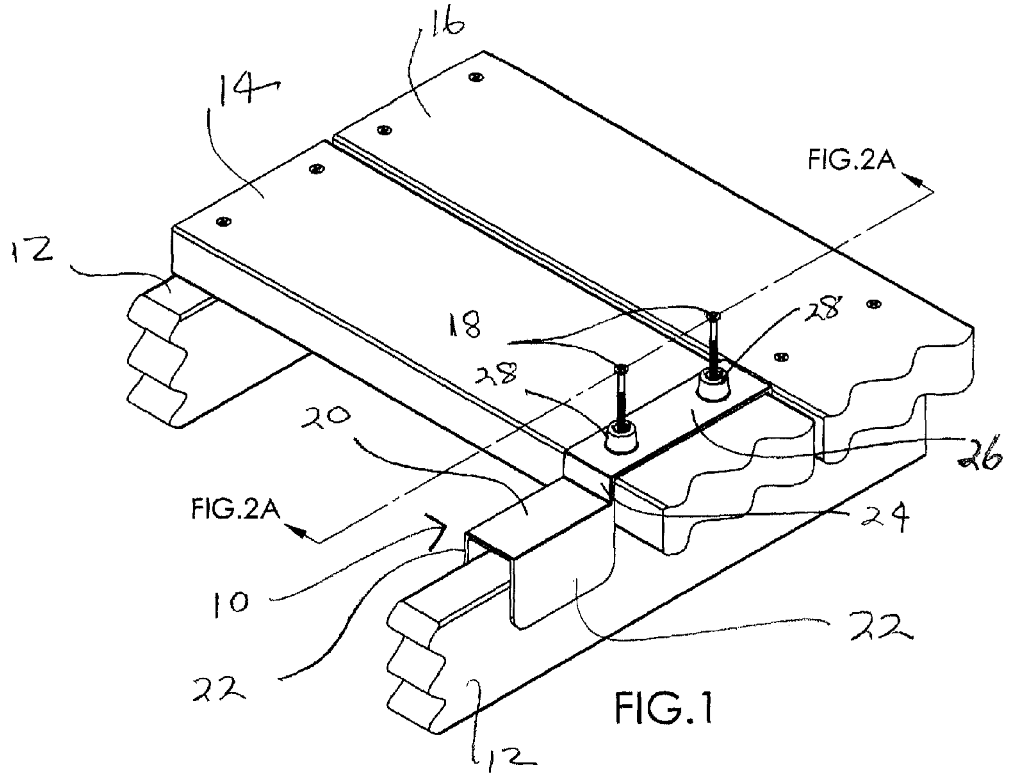
FIG. 1 is a top perspective view of one embodiment of the disclosed technology in use on a joist for assisting in installing a deck board.

FIG. 1 depicts one embodiment 10 of the instant fastener guide in use on a joist 12 for assisting in installing a deck board 14. An already-installed deck board 16 is also depicted. Two screws 18 are shown in guide 10 ready to be driven into board 14.

Fastener guide 10 has first proximal part 20 which rests upon joist 12. First proximal part 20 has a pair of spaced-apart, downwardly extending tabs 22, one for extending down along each side of joist 12. In this embodiment, guide 10 has an intermediate step part 24 which extends up the distance from the top of first proximal part 20 to about the top of board 14. Guide 10 also has second, distal part 26 which extends outwardly from first proximal part 20, and rests upon the top of board 14. Second, distal part 26 is a substantially flat plate, and has two screw supports 28 for temporarily holding screws 18 for insertion through apertures (not shown) in second, distal part 26 into board 14. Screw supports 28 in this embodiment are upstanding, hollow truncated cones extending up from the top of distal part 26. Supports 28 each have a set of a plurality of slightly spaced-apart, radially inwardly extending flexible tabs and a small central opening at their top ends to temporarily hold screws 18. Screws 18 in this embodiment are conventional Phillips-head wood screws.

Figure 2A:
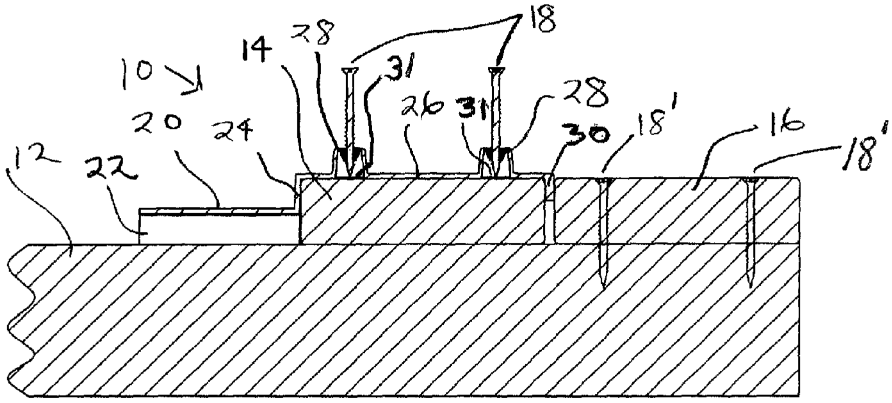
FIG. 2A is a side cross-sectional view of the embodiment depicted in FIG. 1, along section line 2A-2A thereof.

FIG. 2A depicts a side, cross-sectional view of prior FIG. 1. This FIG. 2A more fully depicts screws 18' completely driven into already-installed board 16. Also, this Figure newly depicts optional deck board spacer tab 30 extending downwardly from the most distal edge of the second, distal part 26 of the guide 10. Spacer tab 30's distal end touches the nearest side of the adjacent, already-installed board 16, and spacer tab 30's proximal end touches the farthest side of the board 14 to be installed. This way, the thickness of spacer tab 30 establishes the spacing distance between adjacent deck boards 14 and 16.

Also, FIG. 2A newly depicts apertures 31 through second, distal part 26. Apertures 31 are spaced apart to correspond to the desired spacing of the screws 18 in board 14. This way, when the screws are driven into the board through the apertures, they are positioned as desired-centered into joist 12, and uniformly driven into board 14, with preferably consistent distance between screws and consistent distances from the front, back and side edges of board 14. Also this way, the screws positions in board 14 are consistently the same as in adjacent board 16, resulting in a secure connection of the board to the joist, and in a pleasing aesthetic look due to the straight line and consistent spacing of the screws in the boards all across the finished deck.

Figure 2B:
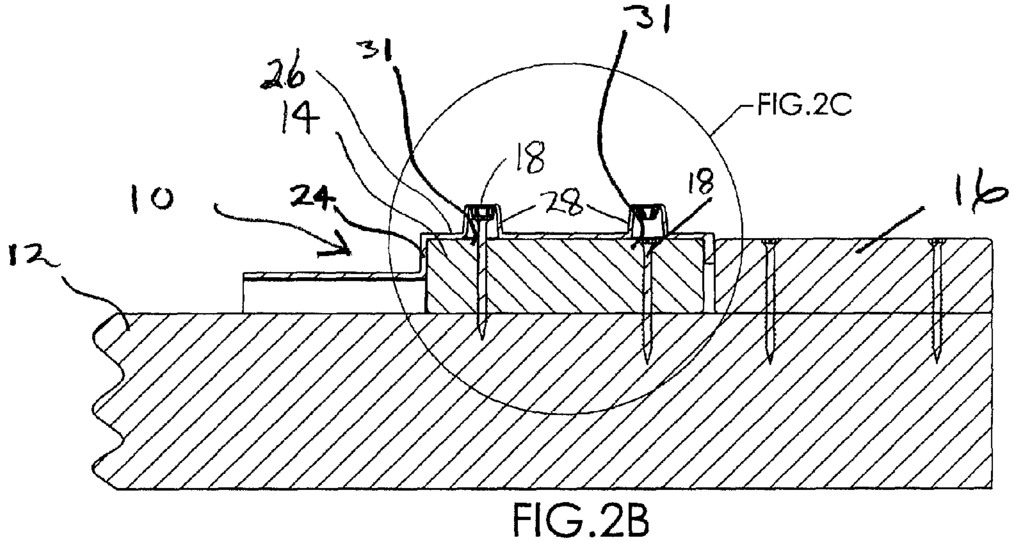

FIG. 2B is the same view as FIG. 2A, except one of the screws 18 in the circled area, the one on the right side in the circle, is completely driven into board 14. The other screw 18 in the circle, the one on the left side thereof, is partially driven into board 14. This Figure depicts the action of screw supports 28 in first supporting the screws 18 in the desired position, and then flexing to allow the screws to be driven in past the supports, 28, through apertures 31, and into board 14.

Figure 2C:
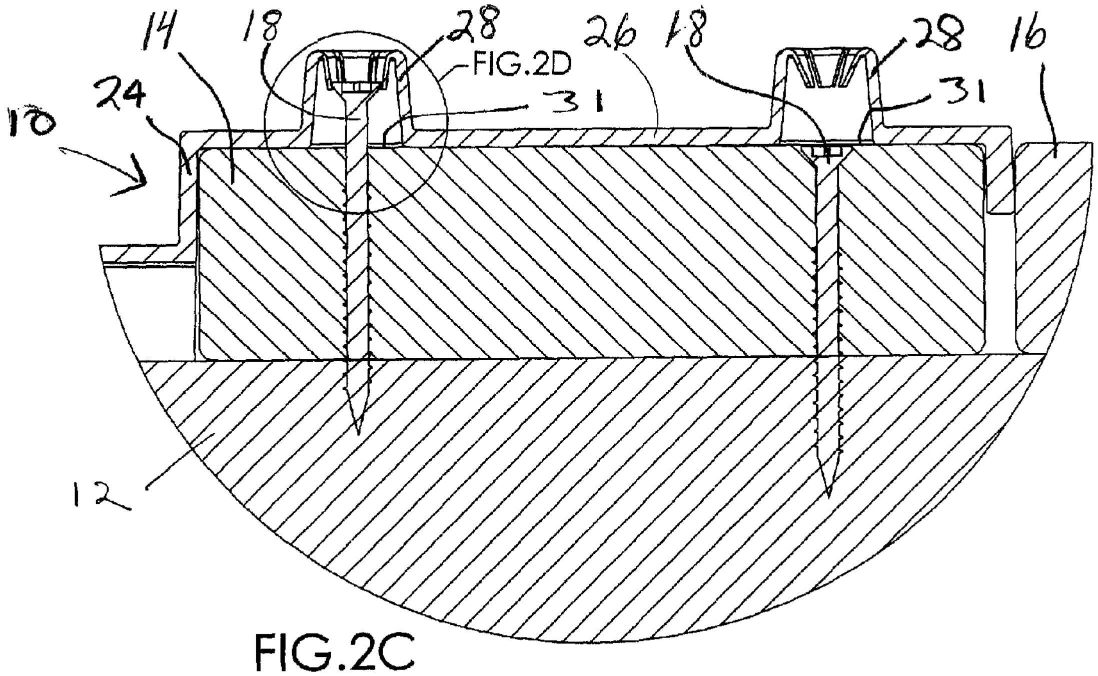
FIGS. 2C and 2D are enlarged detail views of the circled areas in FIGS. 2B and 2C, respectively.

FIG. 2C depicts an enlarged, detail view of the circled area in FIG. 2B. This Figure depicts the flex in the tabs in the top of screw supports 28 for allowing screws 18 to pass through.

Figure 2D:
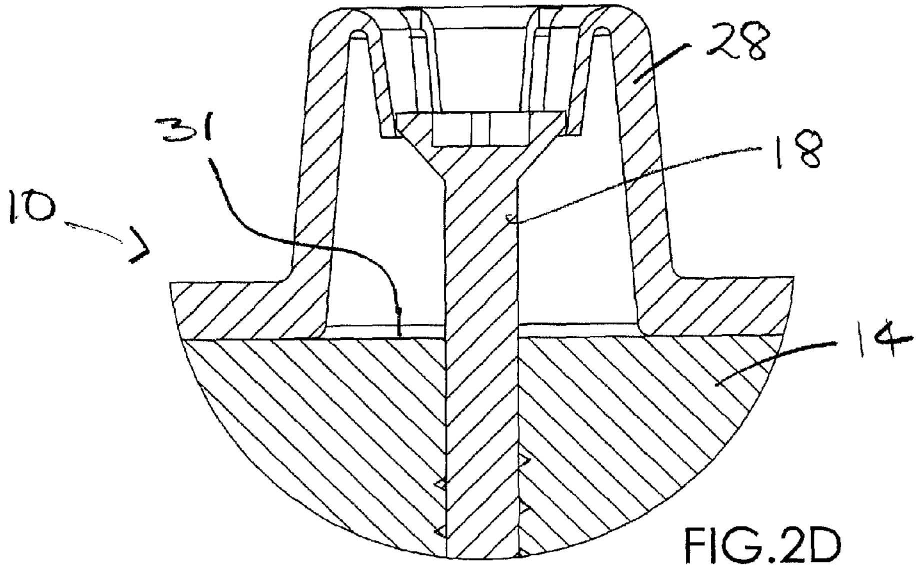

FIG. 2D depicts a further enlarged, detail view of the circled area in FIG. 2C. This Figure depicts the maximum flex in the top tabs of screw support 28 for allowing screw 18 to pass through.

Figure 3:
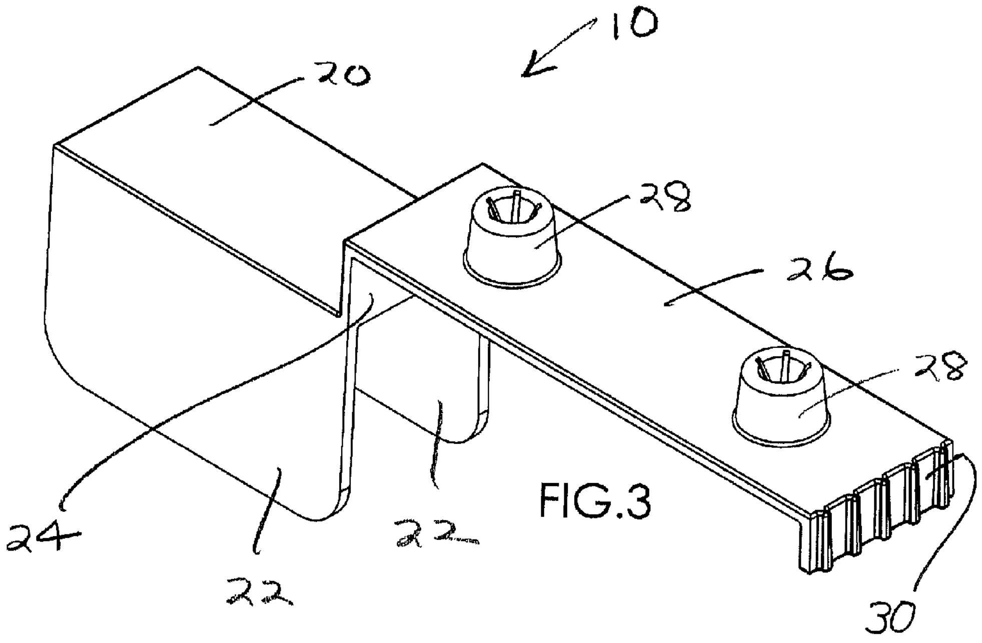
FIG. 3 is a top perspective view of the embodiment of the tool depicted in FIGS. 1-2D, with the optional board spacer at the farthest distal edge thereof.

FIG. 3 depicts a top perspective view of the instant fastener guide 10 depicted earlier in FIGS. 1-2D. Fastener guide 10 has first proximal part 20 with a pair of spaced-apart, downwardly extending tabs 22. In this embodiment, tabs 22 are substantially longitudinal, in that one of their greatest dimensions is parallel to the longitudinal centerline of distal part 26. In this embodiment, guide 10 has intermediate step part 24 which extends upwardly from the most distal end of first proximal part 20 to the most proximal end of second, distal part 26. Preferably, the length of intermediate step part 24 is approximately the same as the thickness of the deck board to be installed. Distal part 26 is a substantially flat plate which extends outwardly from first proximal part 20 and intermediate step part 24. Distal part 26 has two screw supports 28 extending upwardly from its top surface. Also, at the most distal edge of the second, distal part 26 of guide 10 is optional, downwardly extending tab 30 with a thickness which establishes the spacing between adjacent deck boards.

Figure 4:
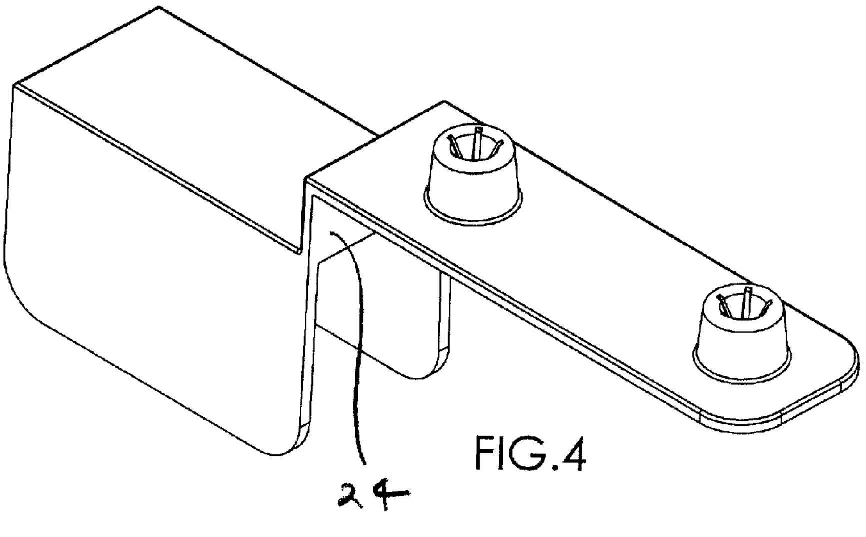
FIG. 4 is a view like in FIG. 3, but of an embodiment without the optional board spacer.

FIG. 4 is a view like in FIG. 3, but of an embodiment without the optional board spacer 30.

Figure 5A:
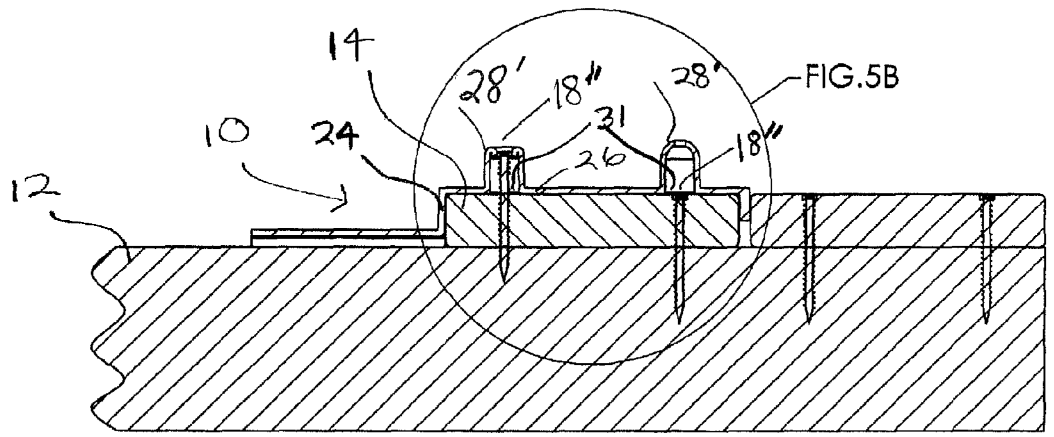
FIGS. 5A-5C are a series of side cross-sectional views like in FIGS. 2B-2D, respectively, but with a different type of optional fastener support.

FIG. 5A is a view like in FIG. 2B, but with a different type of screws 18" and different optional fastener supports 28'. Screws 18" are TORX®  screws, a registered trademark of Acument Intellectual Property LLC. Supports 28' are upstanding, hollow cylinders extending from the top of distal part 26. Supports 28' each have a flexible domed top with a central orifice to temporarily hold screws 18".

Figure 5B:
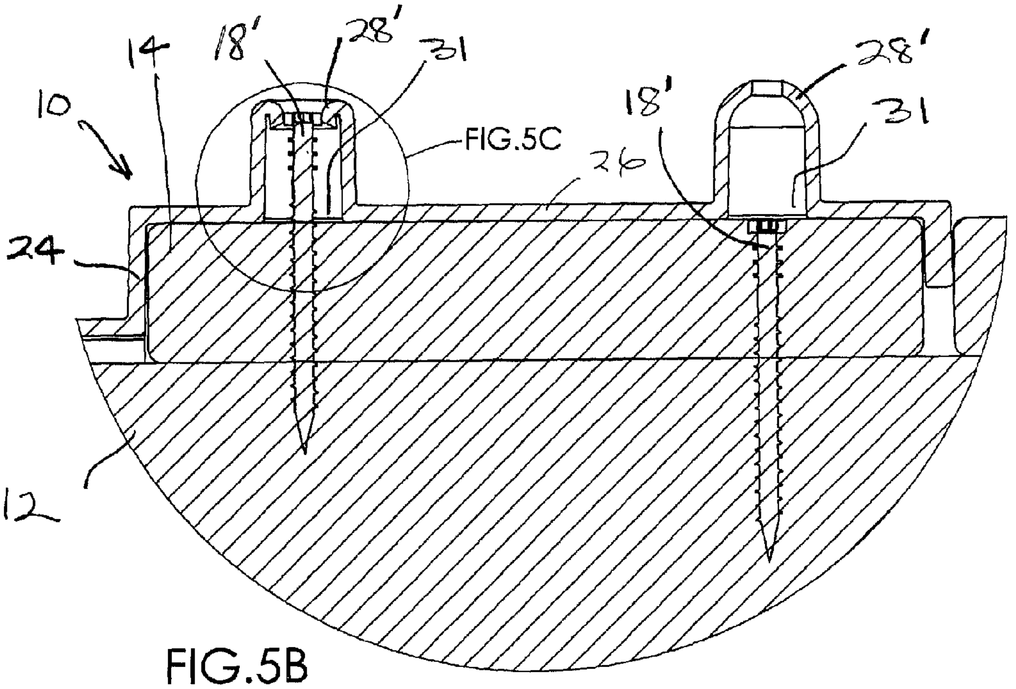
Figure 5C:
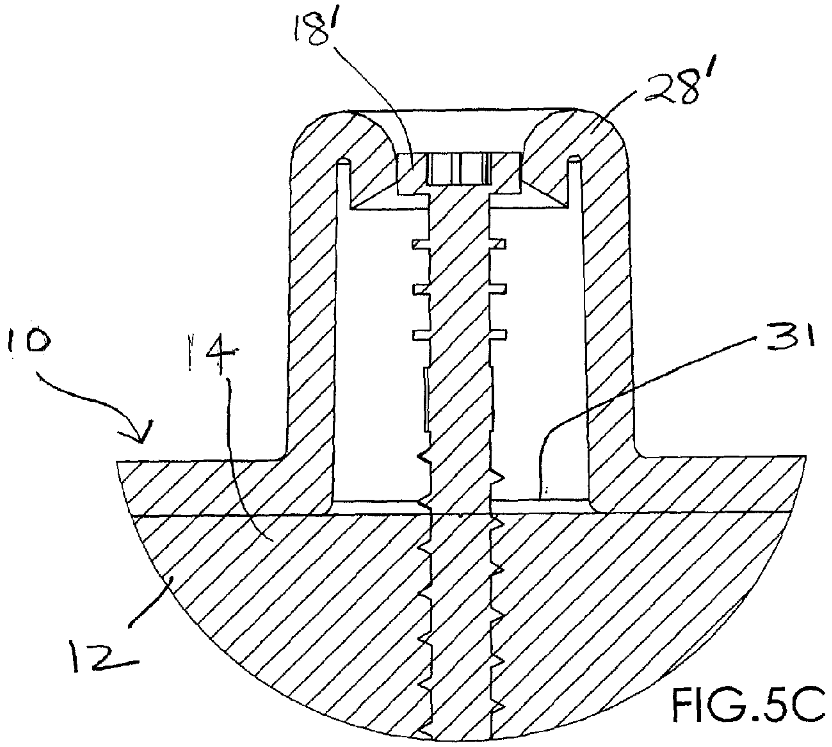

FIGS. 5B and 5C are views like in FIGS. 2C and 2D, respectively, but with the different TORX® screws 18" and different screw supports 28'. These Figures depict the action of screw supports 28' in first supporting the screws 18" in the desired position, and then flexing to allow the screws to be driven in past the supports 28', through apertures 31, and into board 14.

Figure 6:
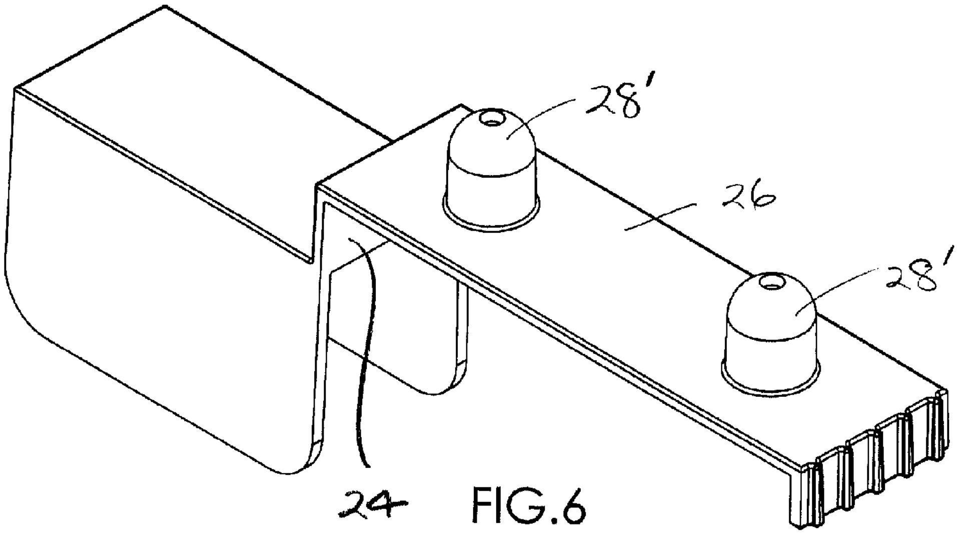
FIG. 6 is a top perspective view of the tool embodiment like in FIG. 3, but with the different optional fastener supports depicted in FIGS. 5A-5C.

FIG. 6 is a view like in FIG. 3, but with the different optional fastener supports 28'.

Figure 7:
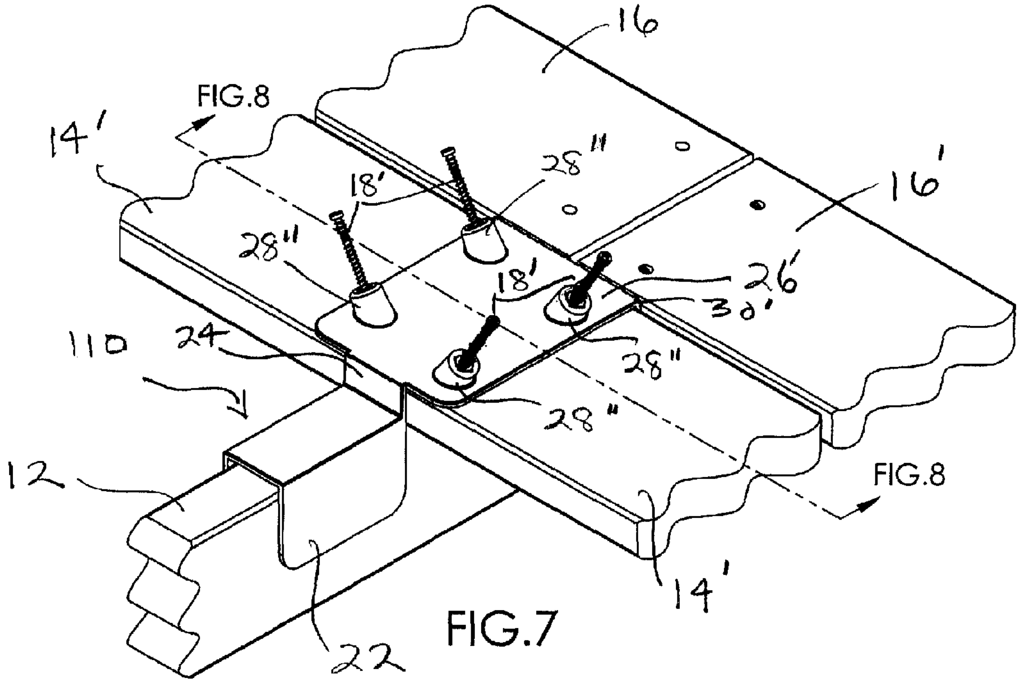
FIG. 7 is a top perspective view of another embodiment in use on a joist for assisting in securing two deck boards placed in end-to-end fashion on the joist.

FIG. 7 is a view like in FIG. 1, but with a different embodiment of the present deck fastener guide 110 in use on a joist 12 for assisting in securing two deck boards 14' placed in end-to-end fashion on the joist. In this embodiment of the invention, second, distal part 26' of fastener guide 110 extends laterally over the end edges of both boards 14'. Also, the top surface of distal part 26' has two sets of screw supports 28", one set of two lateral edge screw supports for the end of each board 14'. Optional supports 28" extend upwardly from the top surface of distal part 26' at an angle of approximately 30-35° towards the lateral side edges of distal part 26'. In this embodiment, the screw supports 28" are of the truncated cone type depicted in FIGS. 1-4, but extending upwardly at an angle. The four (4) screws depicted in use with this embodiment are the 18" type, namely TORX®, and apertures 31' are adapted to let these screws pass through.

Figure 8:
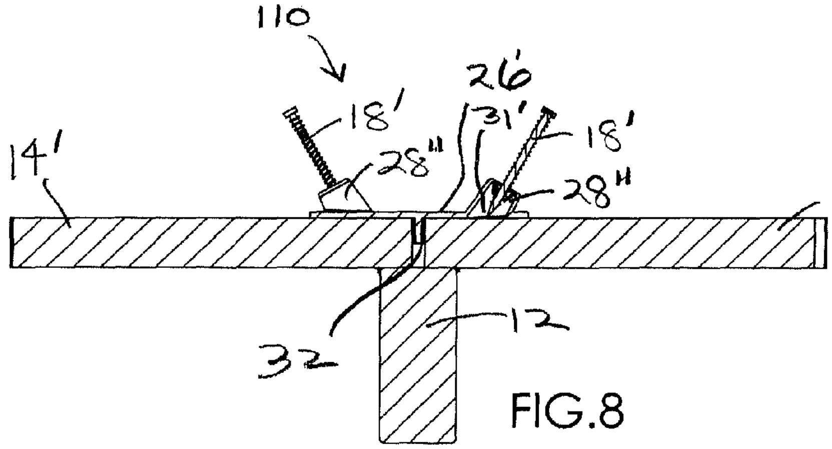
FIG. 8 is a side cross-sectional view of the embodiment depicted in FIG. 7, along section line 8-8 thereof.

FIG. 8 is a side cross-sectional view of the embodiment depicted in FIG. 7, along section line 8-8 thereof. In this Figure is newly depicted optional middle spacer tab 32 which extends downwardly from the bottom central surface of distal part 26' parallel to the lateral side edges. Preferably, middle spacer tab is about the width of the desired spacing between the ends of boards 14', in order to conveniently separate the boards properly before securement thereof. Also, preferably middle spacer tab 32 is made of an easily compressible material, like a soft foam or a resilient plastic bristle, for example, so that guide 110 may be more easily removed after deck board 14' is installed.

Figure 9:
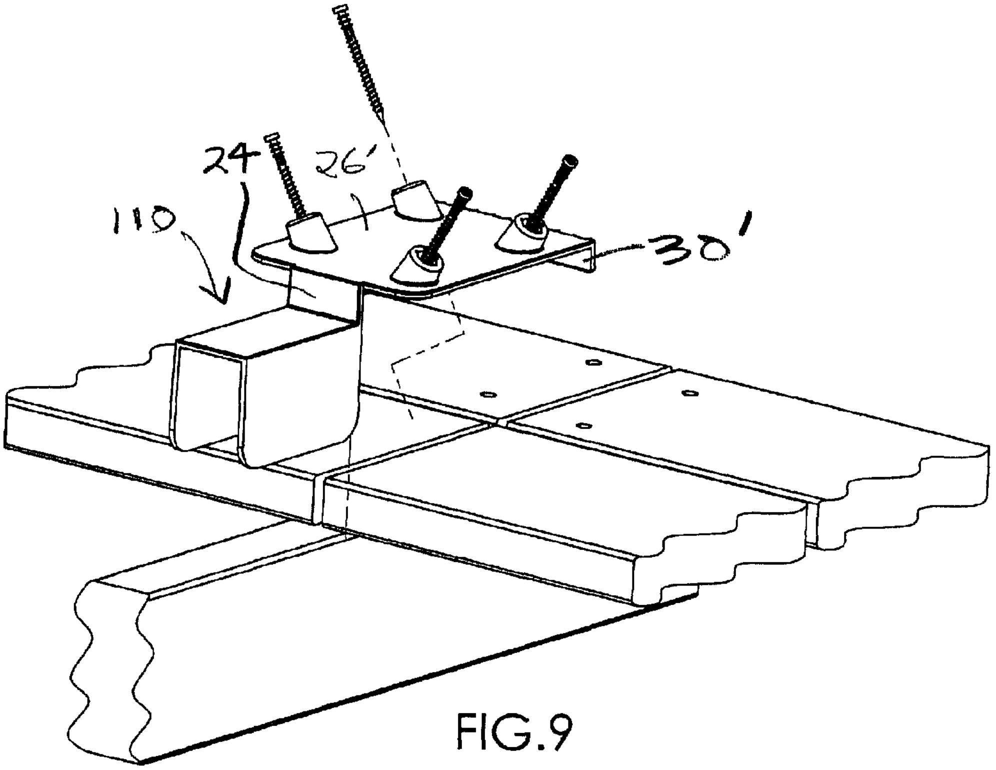
FIG. 9 is an exploded, top perspective view of the embodiment depicted in FIGS. 7 and 8.

FIG. 9 is an exploded, top perspective view of the embodiment depicted in FIGS. 7 and 8.

Figure 10:
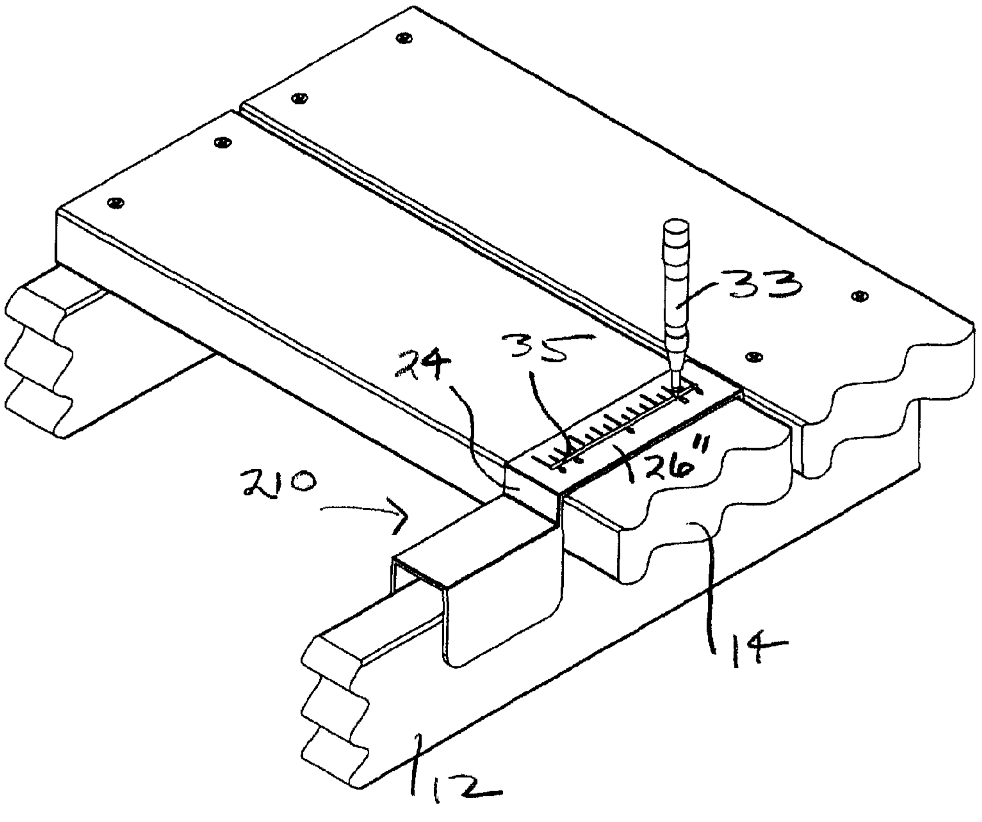
FIG. 10 is a top perspective view of another embodiment in use on a joist for assisting in marking the deck board with a separate scribe.

FIG. 10 is a top perspective view of another embodiment of the present deck fastener guide 210 in use on a joist 12 for assisting in marking the deck board 14 with a separate scribe tool 33. In this embodiment, the distal part 26" does not have apertures adapted to let screws pass therethrough, nor screw supports. Instead, distal part 26" has a central longitudinal slot 35, substantially parallel to the lateral side edges of, and through, distal part 26". Preferably, slot 35 is adapted to be positioned directly above the centerline of joist 12 when guide 210 is resting on the joist. Preferably, slot 35 is marked with indicia to indicate to the user the proper places in the slot to mark board 14 with the scribe to indicate the desired location of screws. This way, after board 14 is marked, deck fastener guide 210 may be removed, and the screws accurately driven into board 14 where indicated by marks made with scribe 33.

Figure 11:
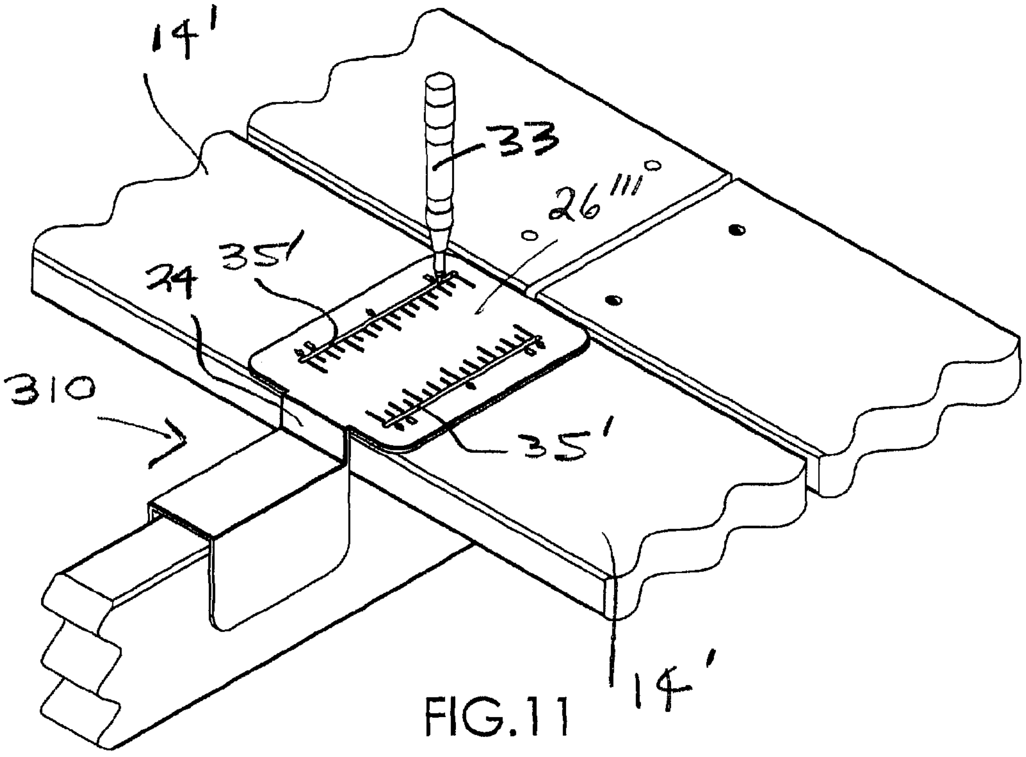
FIG. 11 is a view like in FIG. 10, but of another scribe marking embodiment of the tool for assisting in securing two end-to-end deck boards.

FIG. 11 is a view like in FIG. 10, but of another embodiment of the present deck fastener guide 310 for assisting in securing two deck boards 14' placed in end-to-end fashion on joist 12. This way, fastener guide 310 may be used with scribe tool 33 to mark both boards 14' through both slots 35' in second, distal part 26'" to indicate the desired placement of screws. Guide 310 also has a middle spacer tab (not shown) similar to tab 32 as depicted in FIG. 8 for conveniently spacing the lateral edges of the boards 14' properly before securement thereof.

Figure 12:
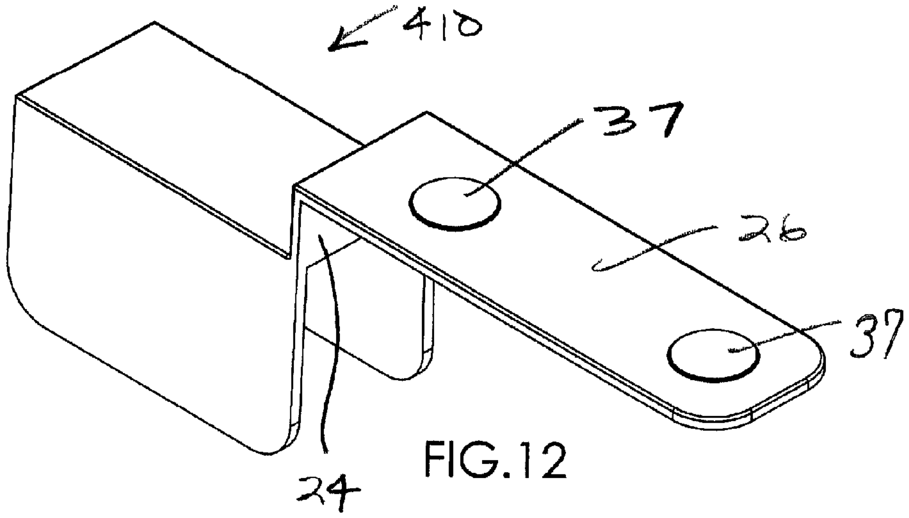
FIG. 12 is a top perspective view of another embodiment for marking the deck board with a hammer by rapping the top of the flat plate of the distal part of the tool which has sharp points on its bottom surface.

FIG. 12 is a top perspective view of another embodiment of the present deck fastener guide 410 for marking the deck board by rapping the top surface of the distal part 26" of the guide with, for example, a hammer in the appropriate indicated locations. Distal part 26" preferably has a set of indicia or reinforced areas 37 on its top surface for indicating where to strike the guide with a hammer.

Figure 13:
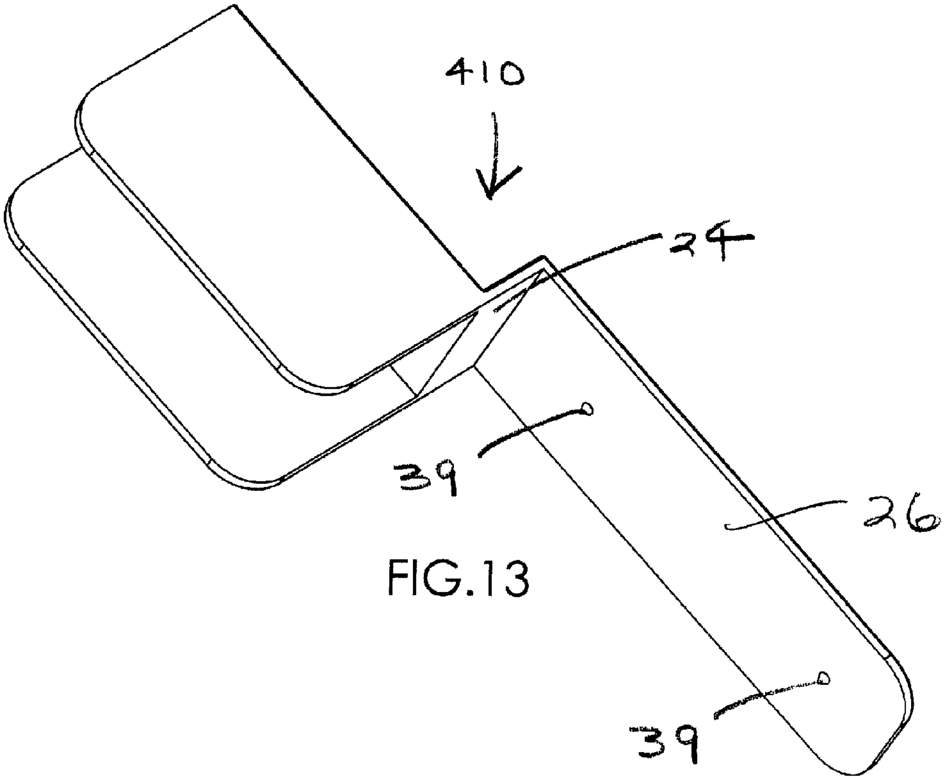
FIG. 13 is a bottom perspective view of the embodiment depicted in FIG. 12.

FIG. 13 is a bottom perspective view of the embodiment 410 depicted in FIG. 12. This Figure depicts sharp marking points 39 on the bottom surface of the distal part 26" of guide 410. Sharp points 39 on the bottom surface correspond generally to indicia or reinforced areas 37 on the top surface of distal part 26". This way, when the guide 410 is put in place, and area 37 on the top is struck with a hammer, the shock of the blow is transmitted through distal part 26" to sharp point 39 on the bottom which marks the top of the deck board to be installed with a dent. Then, screws can be accurately driven into the deck board at the proper, indicated locations to effectively secure the deck board to the joist.

Figure 14:
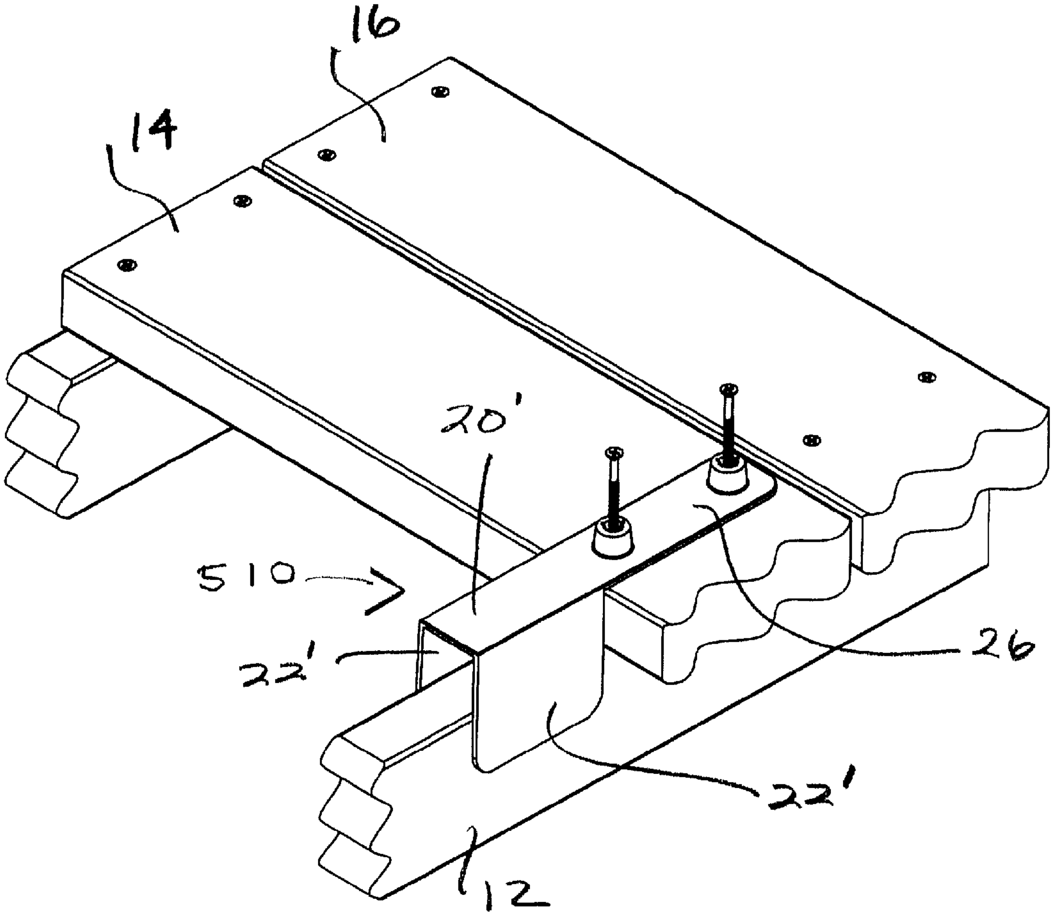
FIG. 14 is a top perspective view of another embodiment of the tool in use.

FIG. 14 is a top perspective view of another embodiment 510 of the present deck fastener guide. In this embodiment guide 510 has first, proximal part 20' which is suspended above joist 12 when guide 510 is placed on board 14 and above joist 12. First, proximal part 20' has a pair of spaced-apart, downwardly extending tabs 22', one for extending down along each side of joist 12. In this embodiment, guide 510 does not have the intermediate step part 24 of guide embodiments 10, 110, 210, 310 and 410 depicted in FIGS. 1-7 and 9-14. Instead, guide embodiment 510 has no intermediate transition in shape between first, proximal part 20' and second, distal part 26. In guide 510, second, distal part 26 extends outwardly from first, proximal part 20' in approximately the same plane. This way, guide embodiment 510 may be more conveniently and economically manufactured. In this embodiment, tabs 22' may be angled inwardly slightly from the lateral edges of first proximal part 20' towards the longitudinal centerline of guide 510 in order to create a slight friction fit along the sides of joist 12, thereby ensuring a more secure fit for guide embodiment 510.

Figure 15:
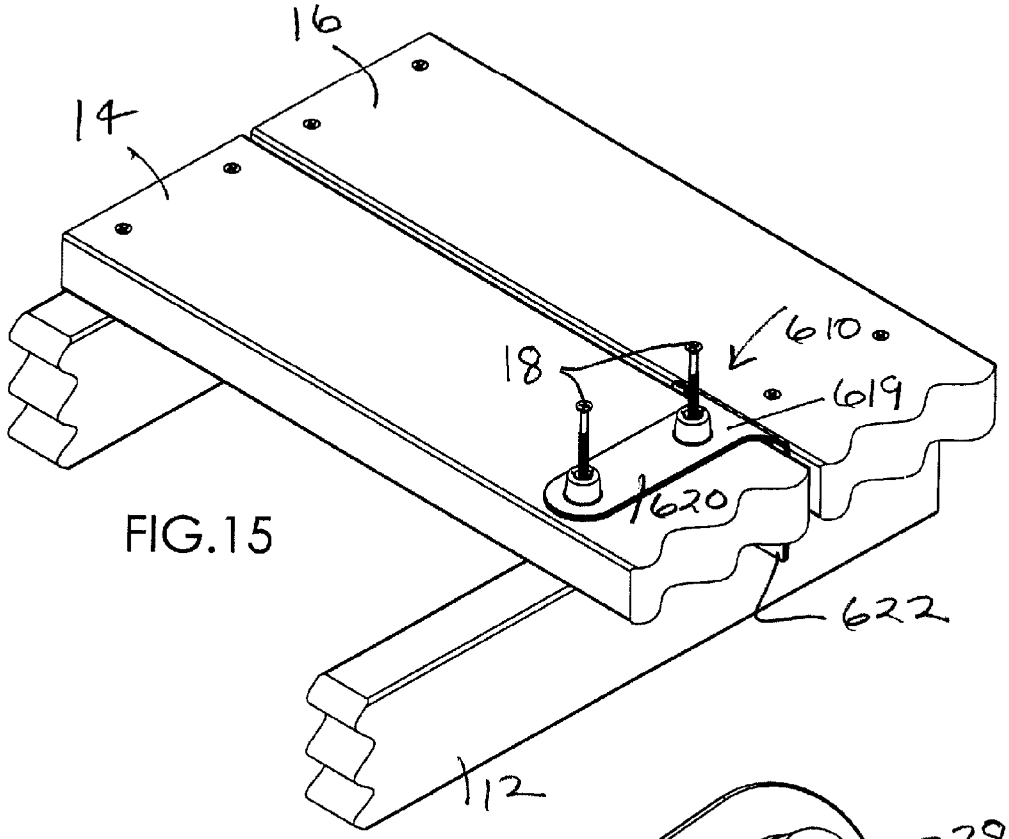
FIG. 15 is a front top perspective view of another embodiment of the tool in use.
Figure 16:
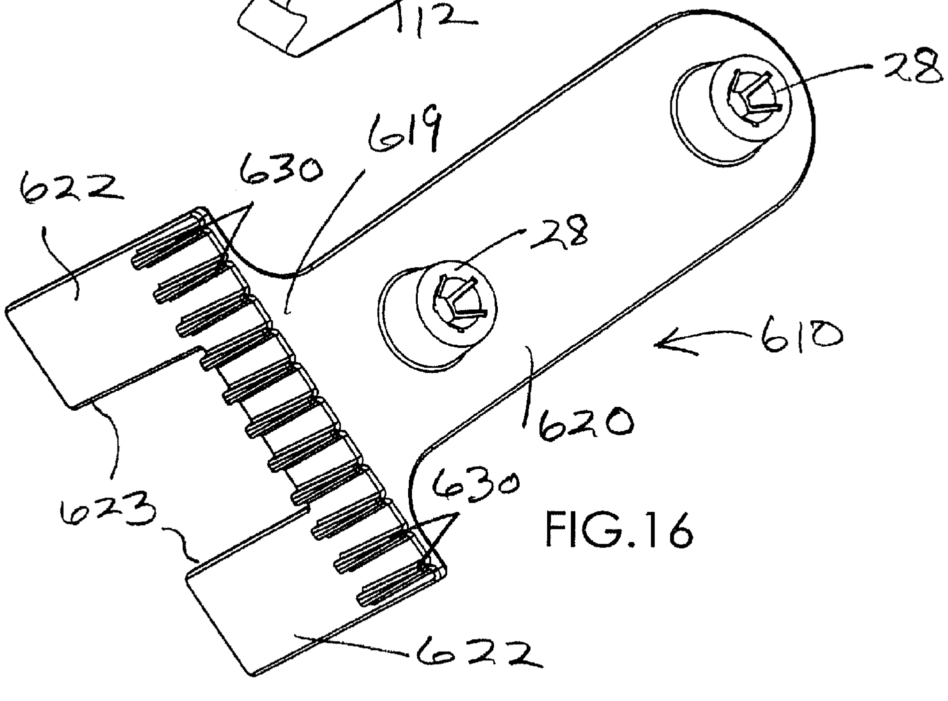
FIG. 16 is a rear top perspective view of the embodiment of the tool depicted in FIG. 15, with the optional board spacer at the nearest proximal edge thereof.

FIG. 15 is a front top perspective view of another embodiment 610 of the tool in use on joist 12 and board 14 to help install board 14. FIG. 16 is a rear top perspective view of tool 610. Guide embodiment 610 has first, proximal end 619 which is a relatively wide and flat support which extends distally into second, distal end 620. Proximal end 619 is adapted for suspending flat tabs 622 down vertically, for placement of one tab 622 on each side of joist 12. Tabs 622 are relatively thin and flat, extending transversely towards the centerline of guide embodiment 610 which centerline extends distally down the middle of proximal end 619 and distal end 620. The inside edges 623 of tabs 622 are preferably flat and straight, and spaced apart to fit comfortably over the top edges and down the sides of joist 12. This way, when guide embodiment 610 is resting on joist 12, tabs 622 act to center and stabilize the guide embodiment 610 on deck board 14 and directly above joist 12. Also this way, when guide embodiment 610 is fitted with screw supports 28 and apertures (not shown) therebeneath, it may be used to locate effective places for screws to be driven through the guide 610, and effectively into joist 12. Guide 610 may also be optionally fitted with deck board spacer 630 which extends along the proximal end of guide 610 and has raised ridges extending proximally from the front surface of proximal end 619 and tabs 622. Preferably, the thickness of these raised ridges is about the same as the desired spacing between the deck boards. Also, preferably these raised ridges are made of an easily compressible material, like a soft foam or a resilient plastic bristle, for example, so that guide 610 may be more easily removed after deck board 14 is installed.

Guide embodiment 610 then, is especially well adapted for those deck-building craftsmen who prefer to work down from the top of the previously installed deck boards. Guide embodiments 10, 110, 210, 310, 410 and 510, on the other hand, are especially well adapted for those craftsmen who prefer to work up from the ground in front of the previously installed deck board(s).

Screw supports 28, 28' and 28", apertures 31 and 31', slots 35 and 35', reinforced areas 37 and corresponding sharp points 39 are all examples of “fastener placements”, that is, structure on or in second distal part 26, 26', 26", 26'" or 620 which enable or indicate locations for effectively placing fasteners into and through the deck board to be installed 14, and into joist 12. Other structures for these “fastener placements” for performing either of these functions, enabling or indicating location of fasteners, are contemplated to be within the scope of the subject disclosed technology.

Although this invention has been described above with reference to particular means, materials and embodiments, it is to be understood that the invention is not limited to these disclosed particulars, but extends instead to all equivalents within the scope of the following claims.

I claim:

1. A carpenter's fastener guide for deck boards, comprising:

a first, proximal part, the first, proximal part having a central portion for temporarily resting on or above the top of the joist, said central portion having two lateral sides and two spaced-apart, downwardly extending tabs, one tab extending downwardly from each lateral side of the central portion for extending along each side of the joist; and, a second, distal part for temporarily resting on the top of a deck board resting transversely, and to be installed on the joist, the second, distal part having a longitudinal plate extending distally from said first, proximal part in the same direction as the joist for resting on the top of the deck board to be installed, wherein the second, distal part has a most proximal end, and the first, proximal part has a most distal end, and an intermediate step part extends upwardly from the most distal end of the first, proximal part to the most proximal end of the second, distal part, and the plate having a fastener placement for expediting effective connection of the deck board to the joist.

2. The guide of claim 1 wherein the fastener placement is a plurality of apertures through the plate of the second, distal part.

3. The guide of claim 1 wherein the fastener placement is a longitudinal slot through the plate of the second, distal part, said second, distal part being marked with indicia near said longitudinal slot to assist in properly placing the fasteners.

4. The guide of claim 3 wherein the second, distal part has a plurality of longitudinal slots.

5. The guide of claim 1 wherein the fastener placement is a set of indicia on the top surface of the plate of the second, distal part for being struck with a tool, and a corresponding set of sharp points on the bottom surface of the plate for marking the deck board when a top indicia is struck.

6. The guide of claim 1 wherein the fastener placement is a plurality of upstanding fastener supports extending from said second, distal part.

7. The guide of claim 6 wherein a fastener support comprises a hollow, truncated cone.

8. The guide of claim 7 wherein the cone comprises, at the top of the cone, a plurality of spaced-apart, radially inwardly extending flexible tabs and a central opening.

9. The guide of claim 6 wherein a fastener support comprises a hollow cylinder with a flexible, domed top with a central opening.

10. The guide of claim 6 wherein a fastener support extends up at an angle less than 90°.

11. The guide of claim 1 wherein the second, distal part has a spacer tab which extends downwardly from the center of its bottom surface in the same direction as the joist.

12. The guide of claim 11 wherein the spacer tab has a width which is approximately the same as the desired end-to-end spacing between adjacent deckboards.

13. The guide of claim 1 wherein the second, distal part has a most distal end with an edge, and a spacer tab extending downwardly from the edge of the most distal end.

14. The guide of claim 13 wherein the spacer tab has a thickness which is approximately the same as the desired side-by-side spacing between adjacent deck boards.

15. The guide of claim 1 wherein the length of the intermediate step part is approximately the same as the thickness of the deck board to be installed.

16. The guide of claim 1 wherein the tabs are in the same direction as the joist.

17. The guide of claim 1 wherein the tabs are transverse to the direction of the joist.

* * * * *